(12) United States Patent
Joseph et al.

(10) Patent No.: US 7,537,164 B2
(45) Date of Patent: May 26, 2009

(54) SYSTEM AND METHOD FOR READING CODES ON A SPECULAR BACKGROUND

(75) Inventors: Eugene Joseph, Coram, NY (US); Duanfeng He, S. Setauket, NY (US); Mark Drzymala, Commack, NY (US)

(73) Assignee: Symbol Technologies Inc., Holtsville, NY (US)

( * ) Notice: Subject to any disclaimer, the term of this patent is extended or adjusted under 35 U.S.C. 154(b) by 0 days.

(21) Appl. No.: 11/611,631

(22) Filed: Dec. 15, 2006

(65) Prior Publication Data

US 2008/0142600 A1 Jun. 19, 2008

(51) Int. Cl.
*G06K 7/10* (2006.01)

(52) U.S. Cl. .............. 235/462.32; 235/462.01; 235/462.43; 235/472.01

(58) Field of Classification Search ............ 235/462.01, 235/462.41–462.45, 472.01, 462.32, 462.35
See application file for complete search history.

(56) References Cited

U.S. PATENT DOCUMENTS 4,743,773 A * 5/1988 Katana et al. .......... 235/462.07
4,818,847 A * 4/1989 Hara et al. ................ 235/455
5,406,060 A * 4/1995 Gitin ...................... 235/462.42
5,449,892 A * 9/1995 Yamada ................. 235/462.42
6,105,869 A * 8/2000 Scharf et al. ............ 235/454
2002/0125322 A1 9/2002 McCall et al.
2007/0091332 A1* 4/2007 Nunnink .................. 358/1.6

FOREIGN PATENT DOCUMENTS

EP 0 610 504 8/1994
EP 1 367 527 12/2003
WO 2006/065619 6/2006

* cited by examiner

*Primary Examiner*—Steven S. Paik
*Assistant Examiner*—April A Taylor

(57) ABSTRACT

A barcode reader having a light source illuminating a barcode, a diffuser disposed between the light source and the barcode, a camera opening at least partially surrounded by the diffuser, light reflected from the barcode passing through the camera opening and a camera oriented to acquire light reflected from the barcode after passing through the diffuser from the light source.

19 Claims, 9 Drawing Sheets

SYSTEM AND METHOD FOR READING CODES ON A SPECULAR BACKGROUND

BACKGROUND

1. Field of the Invention

The present invention relates to a system for scanning optical codes formed on specular backgrounds. More specifically, the invention relates to systems for aiming and acquiring a code on a specular background with a portable scanning device.

2. Background

In many situations it is advantageous to identify and track items that are used in some task or that pass through a supply or distribution chain. For certain items it is not practical to attach tags or other identifying implements, such as when the items are very small or are designed to operate in harsh environments. In those cases, a solution is to direct mark the items, meaning that a barcode or other identification element is directly formed on the item's surface.

Direct marking of items is often used for surgical instruments that are tracked during medical procedures, and for other types of small tools. These often have a specular surface which reflects impinging light. This is often problematic for conventional optical code readers, because the mirror-like surface may reflect images to the camera that make it difficult to read the code.

SUMMARY OF THE INVENTION

A barcode reader having a light source illuminating a barcode, a diffuser disposed between the light source and the barcode, a camera opening at least partially surrounded by the diffuser, light reflected from the barcode passing through the camera opening and a camera oriented to acquire light reflected from the barcode after passing through the diffuser from the light source.

A method for providing light through a diffuser to a barcode and a specular background and collecting, by a camera, light reflected from the barcode, the light passing through an opening in the diffuser.

DETAILED DESCRIPTION

Figure 1:
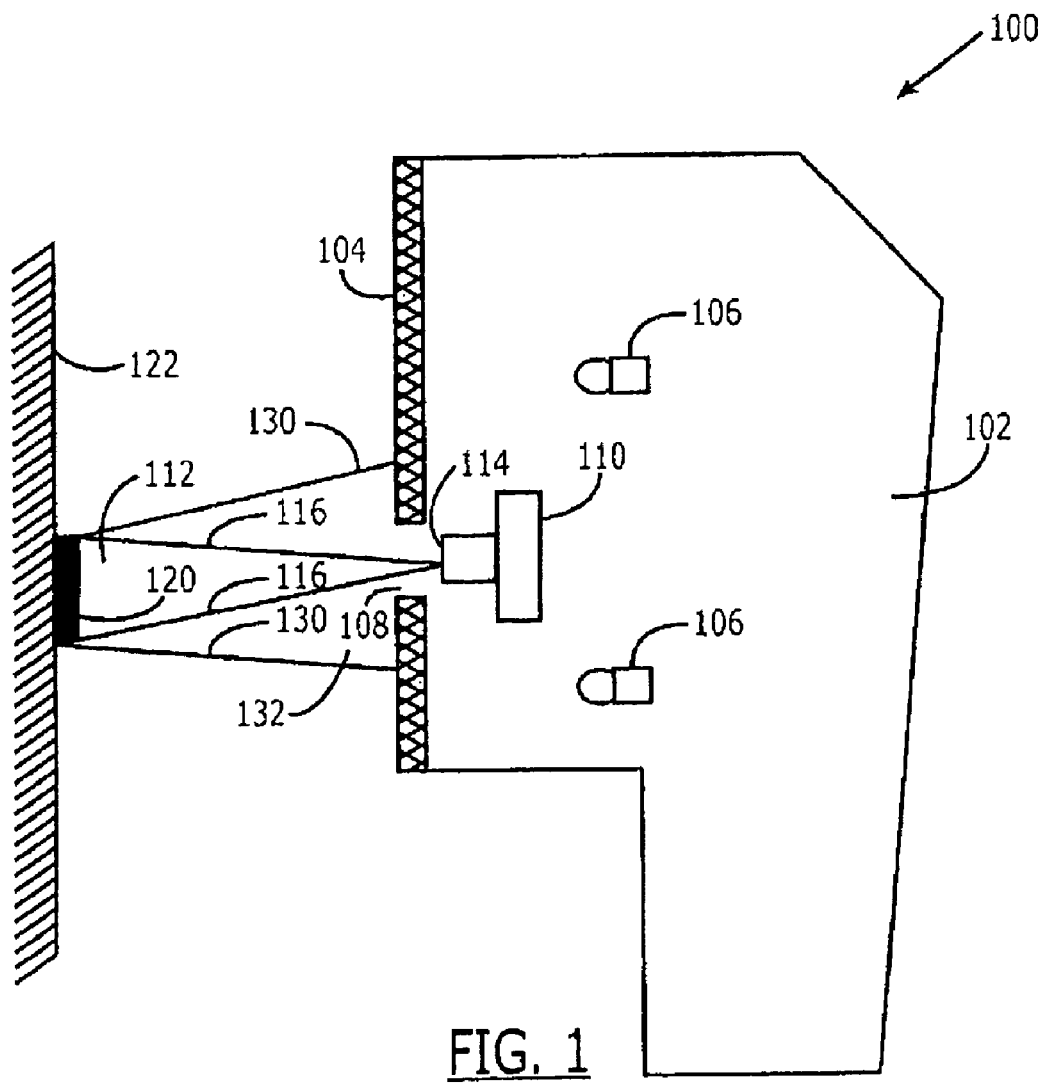
FIG. 1 is a diagram of an exemplary barcode reader having a camera in the center of a diffuser according to the present invention.

The present invention may be further understood with reference to the following description and to the appended drawings, wherein like elements are referred to with the same reference numerals. The present invention relates to a system for scanning optical codes formed on specular backgrounds. More specifically, the invention relates to systems for aiming and acquiring a code on a specular background with a portable scanning device. Throughout this description, the term specular will be used consistent with its common meaning, e.g., of, relating to, or having the qualities of a mirror. That is, the specular background may be any reflective surface to which a barcode is directly applied (e.g., engraved), affixed, etc.

Specular background surfaces offer difficult challenges for barcode reading systems. Those surfaces reflect the illumination source, create highlights that destroy the data of the barcode within the highlight, and reflect images of the reader device back to the reader. To reduce these problems, a diffuse light source rather than a point source is used to illuminate the barcode. The exemplary embodiments of the present invention provide a barcode reader system that can read a barcode formed on a reflective surface. Further exemplary embodiments provide a simple way of aiming the device so the barcode may be acquired.

FIG. 1 shows an exemplary barcode reader 100 used to read a barcode 120 from a specular background surface 122. The barcode reader 100 comprises a housing 102 with a diffuser 104 at one end, designed to provide diffuse light to illuminate the barcode 120. The diffuser 104 may be formed of a light scattering translucent material or from a transparent material modified with a surface texture to provide the diffuse light. The diffuser 104 is illuminated by one or multiple light sources 106. Typically the diffuser 104 is disposed between the barcode 120 and the light sources 106. For example, the diffuser 104 may be circular, oval, or have another shape to fit in the housing 102 of the device 100 The light sources 106 may include LED's, incandescent lights or other light emitters.

A camera 110 is located adjacent to the diffuser 104, so that its image receiving opening 114 faces the barcode 120. In this example, the camera 110 is placed centrally behind a central opening 108 in the diffuser 104. However, placing the camera 110 at the center of the diffuser 104 may be problematic. In the example of FIG. 1, the lines 130 define the boundary of a field of view ("FOV") 132 of the diffuser 104 illuminating the barcode 120. Throughout this description, the term diffuser FOV is used to describe this FOV. However, those skilled in the art will understand that the diffuser itself does not have an FOV. Rather, the term diffuser FOV describes the view of the diffuser 104 by the camera 110. More specifically, the camera 110 sees the reflection of the diffuser 104 from the specular background 122. The barcode 120 prevents some of the light from the reflection of the diffuser 104 from reaching the camera 110 and thus forms a contrast on the image. This contrast is then analyzed to read the barcode 120. However, in the arrangement shown in FIG. 1, the diffuser FOV 132 will include the central opening 108, i.e., the camera 110 will not see a contiguous portion of the diffuser 104. This absence of a reflection of the diffuser 104 in the area of the central opening 108 may cause a black spot or other shadow on the image captured by the camera 110 leading to an unreadable barcode.

Another issue illustrated in FIG. 1, is that if the camera 110 of the reader 100 is aimed orthogonally at the surface 122 containing the barcode 120, the camera rays 116 define a camera FOV 112. As can be seen from FIG. 1, the reflection of the camera 110 may occur within the FOV 112 and may be superimposed on the image of the barcode 120. This may make the barcode 120 unreadable.

Figure 2:
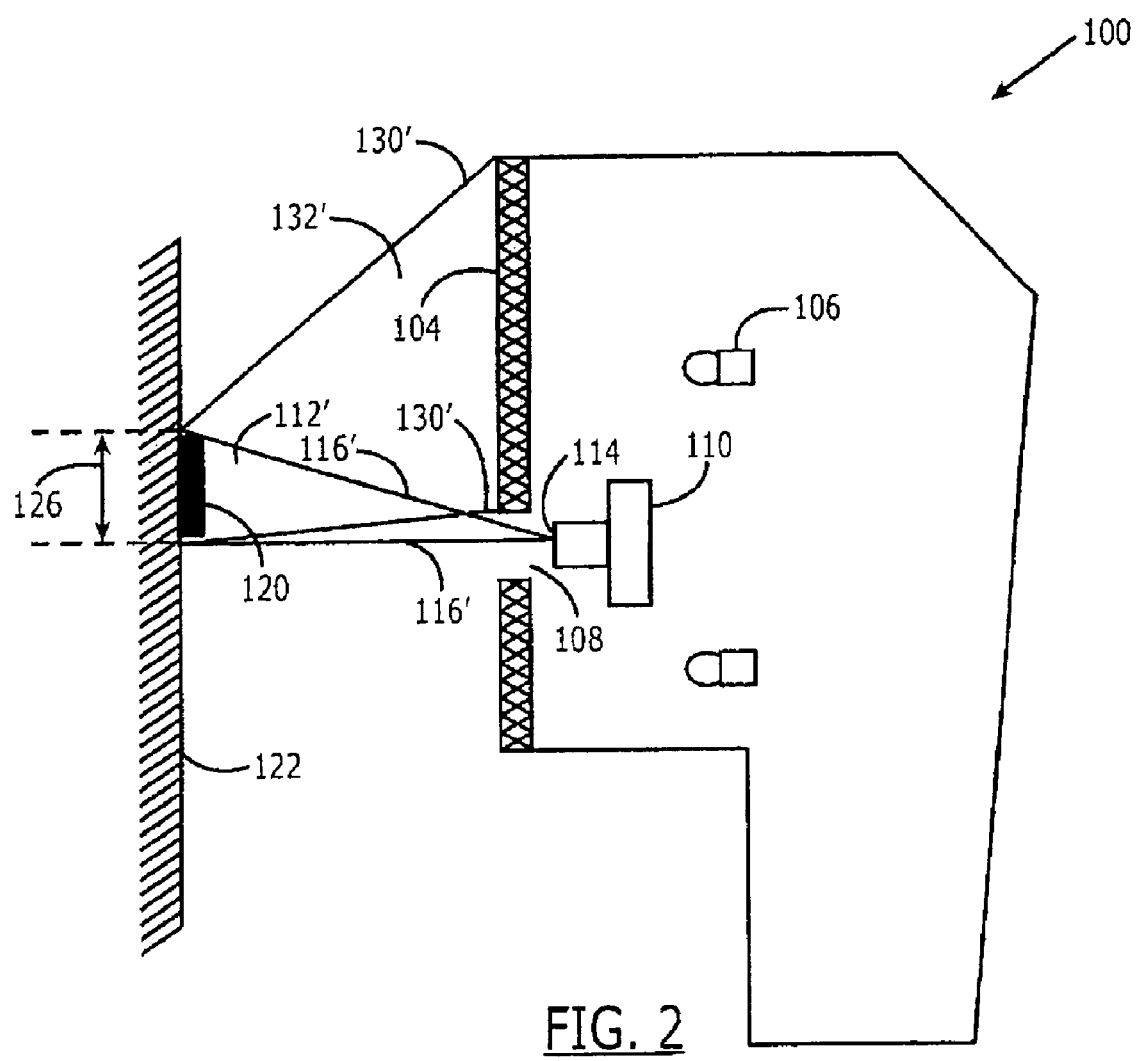
FIG. 2 is a diagram of an exemplary field of view of the barcode reader shown in FIG. 1.

Another problem that may occur by placing the camera 110 in the center of the diffuser 104 is illustrated in FIG. 2. In the configuration shown in FIG. 2, the camera rays shown as lines 116' define a camera FOV 112' for the upper half of the reader 100. In addition, the lines 130' define the diffuser FOV 132'. If the barcode 120 is moved slightly away from the centerline of the camera opening 114, the reflection of the camera 110 may no longer be problematic, but it becomes difficult to maintain the barcode 120 within the FOV 132'. A barcode acquisition region 126 is delimited by the intersection of the FOV 132' and the target surface 122. From the diagram it can be seen that the barcode 120 has substantially the same dimensions as the barcode acquisition region 126. This means that any movement of the barcode 120 relative to the reader 100 puts it outside of the barcode acquisition region 126, leaving no margin of error in placing the reader 100 relative to the barcode 120. As would be understood by those skilled in the art, the placement of the barcode 120 toward the lower half of the reader 100 would result in the same issues since the diffuser 104 is symmetric with respect to the optical axis of the camera 110.

Thus, the system described with respect to FIGS. 1 and 2 becomes impractical because of the small or non-existent margin of error in placing the reader 100 to successfully read the barcode 120. Except for a small range of relative positions, either the reader's image is reflected back into the camera 110, or the light from the diffuser 104, as reflected by the barcode 120, does not reach the camera opening 114. The analysis above also applies to the bottom half of the diffuser 104, since the diffuser 104 is symmetrical with respect to the optical axis of the camera 110.

Figure 3:
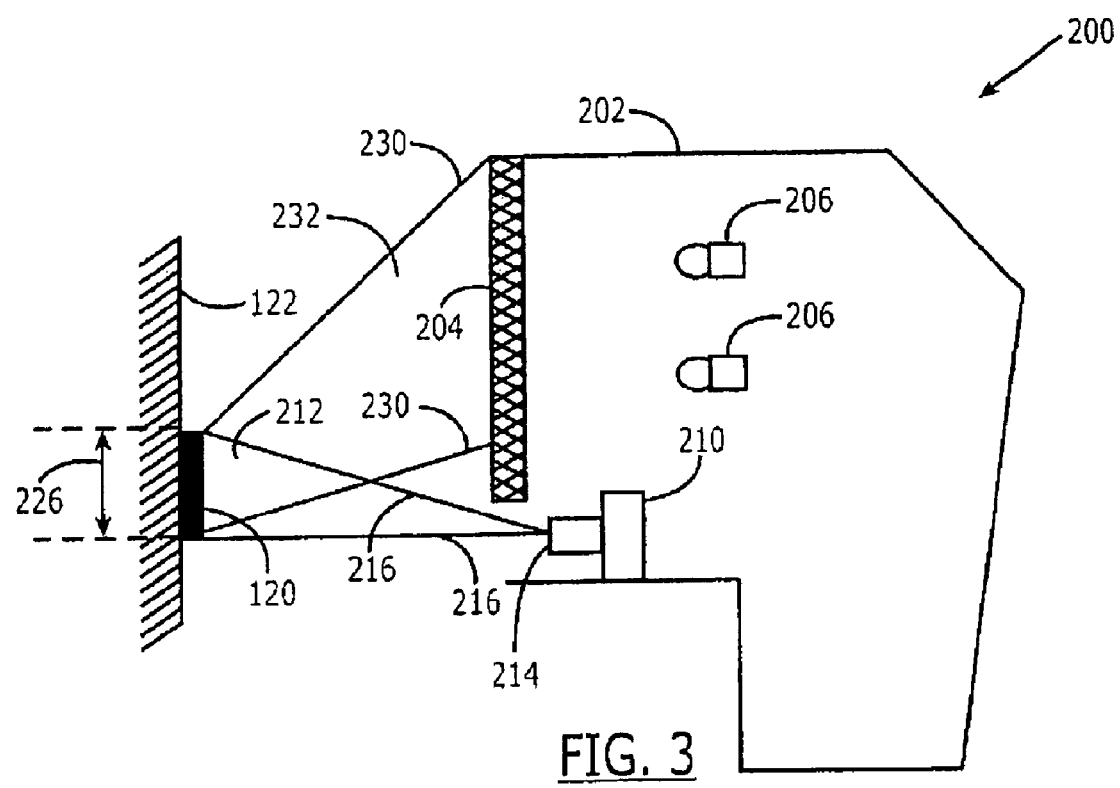
FIG. 3 is a diagram of another exemplary embodiment of a barcode reader having a camera in the periphery of a diffuser according to the present invention.

FIG. 3 shows an exemplary embodiment of a barcode reader 200 according to the present invention. The barcode reader 200 includes a housing 202, a diffuser 204, LEDs 206, and camera 210. In a preferred embodiment of a barcode reader 200 according to the present invention, the camera 210 is located on a side of the diffuser. It should be noted that the placement of the camera 210 at the lower extremity of the diffuser 204 is only exemplary. The camera 210 may be placed anywhere on the periphery of the diffuser 204 to obtain the benefits described herein. The placement shown in FIG. 3 shows a configuration that may be comfortable and intuitive for a user of a reader shaped like the reader 200. Furthermore, the placement of the LEDs 206 is only exemplary and the LEDs 206 (or other light source) may be placed in any location that provides sufficient illumination through the diffuser 204 to illuminate the barcode 120.

This configuration shown in FIG. 3 almost doubles the FOV 232 of the diffuser, so that it is much easier to locate the barcode 120 within the diffuser's FOV 232. There is a much wider range of positions of the barcode 120 relative to the reader 200 that will allow the camera opening 214 to see the light from the diffuser 204 reflected by the barcode 120, without distortions from the reflected image of the camera 210 being also visible.

As shown, the lines 230 define the FOV 232 of the diffuser 204, while the lines 216 define the FOV 212 of the camera. In turn, the intersection of the FOV 232 and the surface 122 delimits the barcode acquisition region 226 where the barcode 120 can be found so that it reflects the light from the diffuser 204 to the camera opening 214. The wider the angular FOV 232, the easer it is to acquire the barcode 120 because the barcode 120 may be located within any portion of the FOV 232 and still be acquired by the camera 210. In this exemplary embodiment, substantially all the locations of the barcode 120 within the barcode acquisition region 226 avoid distortion due to the image of the camera 210 being reflected back to the camera opening 214.

Because of the conical shape of the FOV 232, the size of the barcode acquisition region 226 decreases as the distance between the reader 200 and the barcode 120 increases. This effect can be offset by increasing the size of the diffuser. However, an optimum use for the exemplary barcode reader 200 is to read small, high density barcodes applied to reflective surfaces which are read from small distances. An example of this situation is the tracking of medical instruments during surgical procedures.

Figure 4:
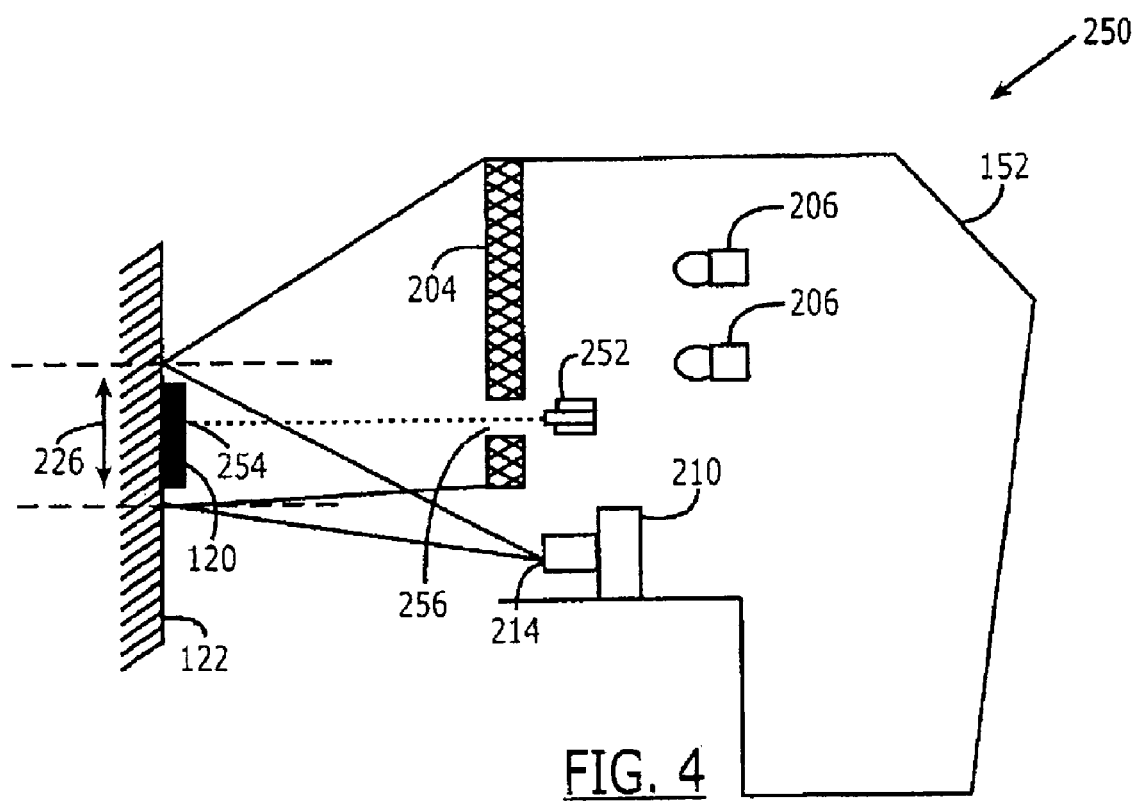
FIG. 4 is a diagram of a third exemplary embodiment of a barcode reader having an aiming device according to the present invention.

In the above embodiment, the barcode acquisition region 226 is not aligned with the center of the diffuser 204. This complicates aiming the device, such that an aiming mechanism may be beneficial. In another exemplary embodiment of a barcode reader 250 shown in FIG. 4, an aiming device 252 is included to facilitate acquisition of the barcode 120. The barcode reader 250 includes the same components as the barcode reader 200 including a housing 152, a diffuser 204, LEDs 206 and a camera 210. As described above, the configuration of these components is only exemplary. The laser aiming device 252 is provided with the barcode reader 250 to facilitate acquisition of the barcode 120 by the camera 210. The exemplary laser aiming device 252 may be placed behind the diffuser 204, and may shine through an aiming window 256 formed therein. The aiming device 252 projects a visible dot of light 254 at an optimum location of the barcode 120. For example, the dot of light 254 may mark the center of the barcode acquisition region 226. The aiming device 252 may be any device that can project a laser light or any defined beam of light through the aiming window 256.

Figure 5:
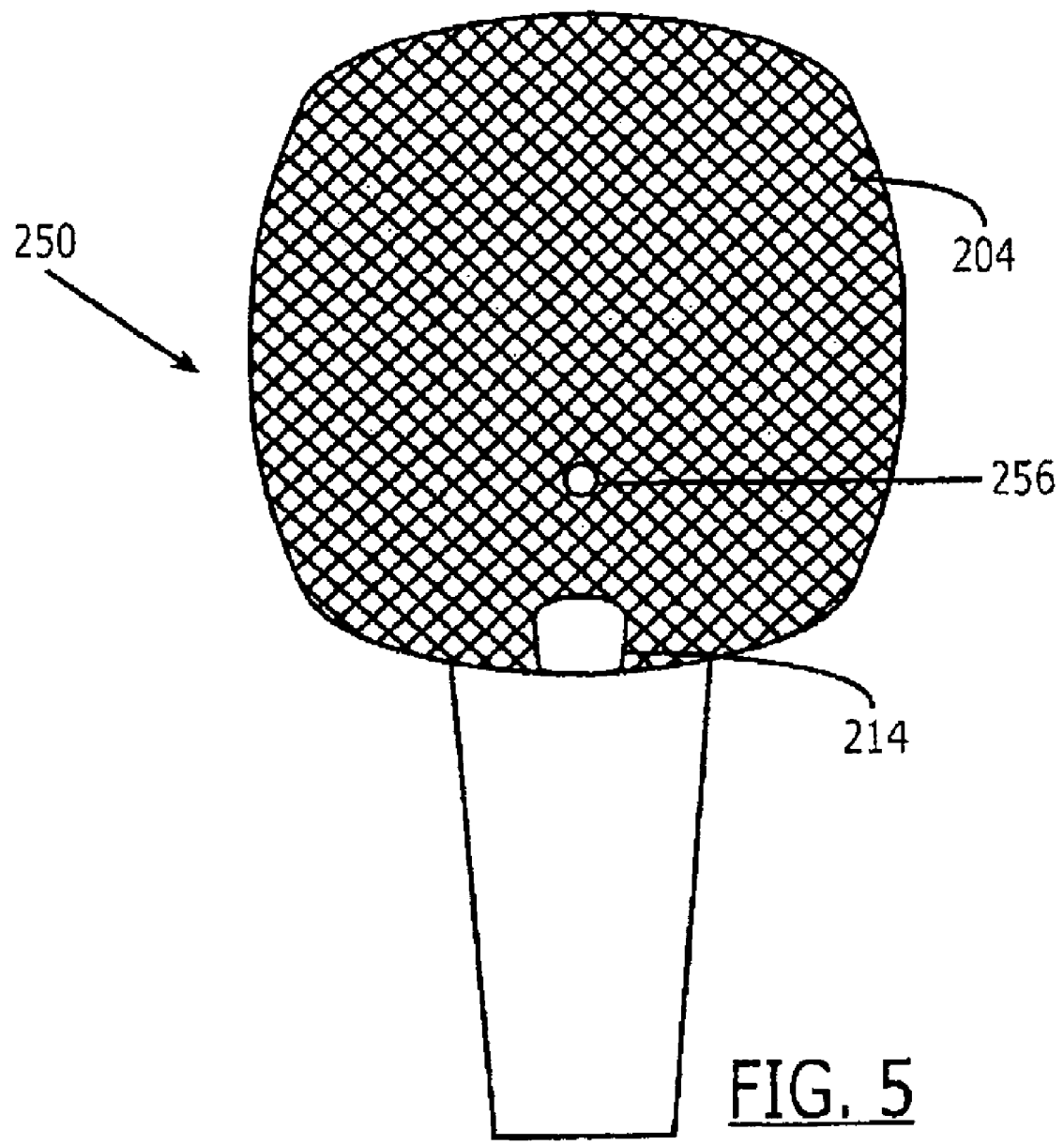
FIG. 5 is a front view of the barcode reader shown in FIG. 4.

A front view of the barcode reader 250 is shown in FIG. 5. The small size of the aiming window 256 reduces or eliminates any optical distortion that a reflected image of the aiming device 252 may cause to the acquisition of the barcode image by the camera 210. The camera opening 214 is also small, and is located at the periphery of the diffuser 204 so that its reflection will not degrade the image of the barcode 120.

Those skilled in the art will understand that it is not necessary to physically locate the camera outside the periphery of the diffuser to obtain the results described above. For example, the objective of the camera opening may be located there, while the body of the camera is at another location. As described in greater detail below, optical elements such as mirrors, light pipes, optic fibers etc. may be used to place an effective camera opening at a location remote from the camera itself.

Figure 6:
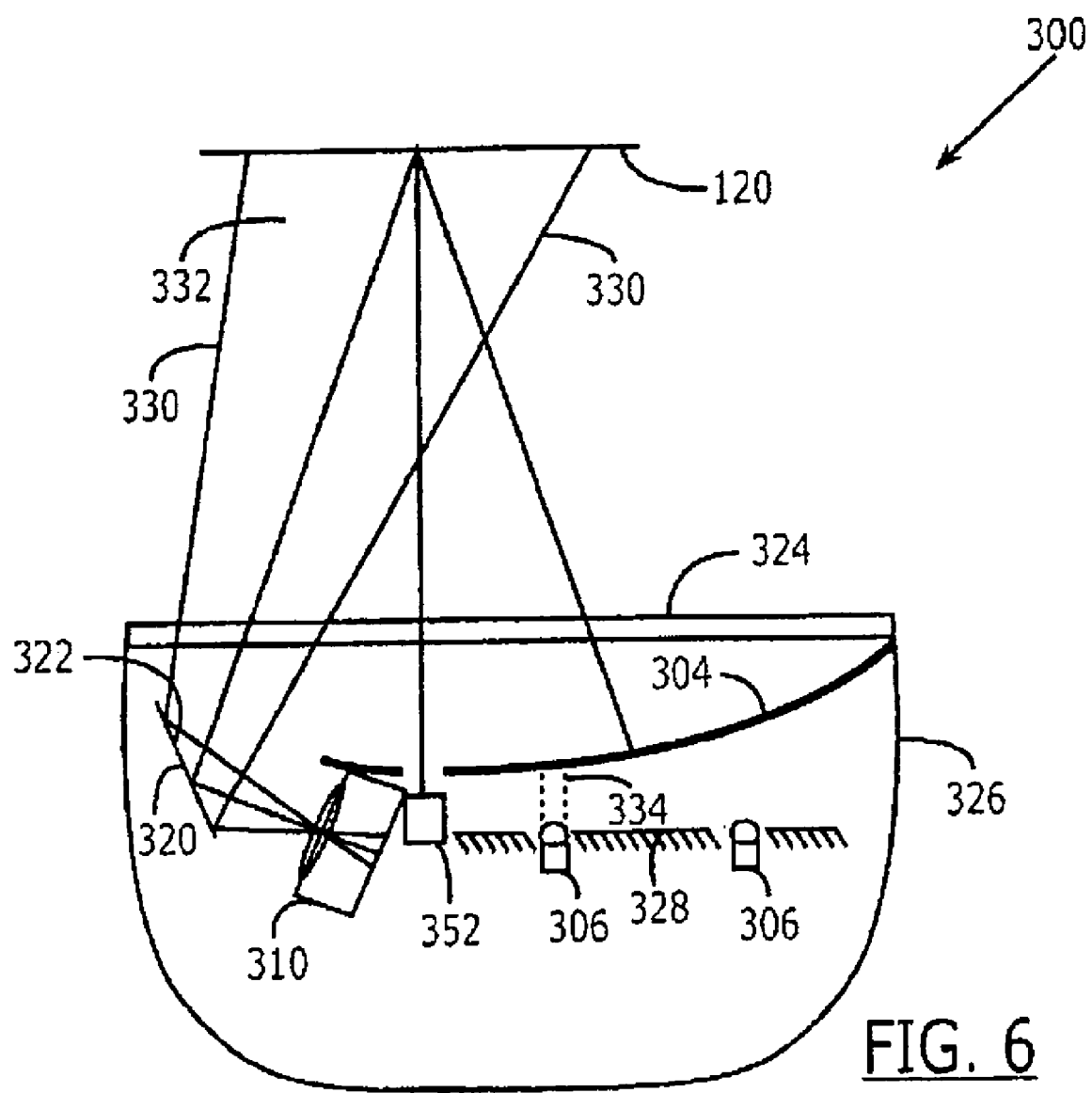
FIG. 6 is a diagram of a fourth exemplary embodiment of a barcode reader having a curved diffuser according to the present invention.

Another exemplary embodiment of a barcode reader 300 according to the present invention is shown in FIG. 6. The reader 300 comprises a housing 326 having a transparent exit window 324 on one side. The diffuser 304 according to this embodiment is curved, so that one edge meets the housing 326 along a portion of the exit window 324. This layout ensures a common boundary of the diffuser 304 and exit window 324, maximizing the dimensions of the diffuser 304 relative to the exit window 324. Because the diffuser 304 is generally concave, it size is further maximized.

A camera mirror 320 is disposed adjacent to an edge of the diffuser 304, to make the camera 310 appear to be located outside of the diffuser 304. Using this mechanism it is possible to generate an effective camera opening 322 that is located away from the edge of diffuser 304, while the camera 310 is located somewhere else, for example behind the diffuser 304. This exemplary embodiment allows more freedom in locating the camera 310 within the housing 326. It also allows the minimization of the size of the effective camera opening 322, and to locate it as desired, such as at the edge of the exit window 324.

As in the exemplary embodiments described above, the diffuser 304 is illuminated by one or more light sources 306. These may comprise LED's or other light elements, and may be coupled to the diffuser 304 by a light pipe 334. A mirrored reflector 328 can be placed behind the diffuser to increase the light efficiency of the diffuse surface light source. In addition, the laser aimer 352 is also included in this embodiment.

As can be seen in the diagram of FIG. 6, the light rays depicted by lines 330 define an angular camera FOV 332. This FOV 332 is larger than an FOV possible with a centrally located camera (e.g., FOV 112 of FIG. 1), and allows easier acquisition of the image from the barcode 120, without the distortion of the image characteristic of a centrally located camera.

For certain applications it may not be practical to design a diffuser and camera arrangement where the camera opening is beyond the edge of the diffuser, or uses a mirror arrangement to create an effective camera opening remote from the camera. For example, to remain compatible with pre-existing readers, it may be necessary to place the camera within the area of the diffuser.

Figure 7:
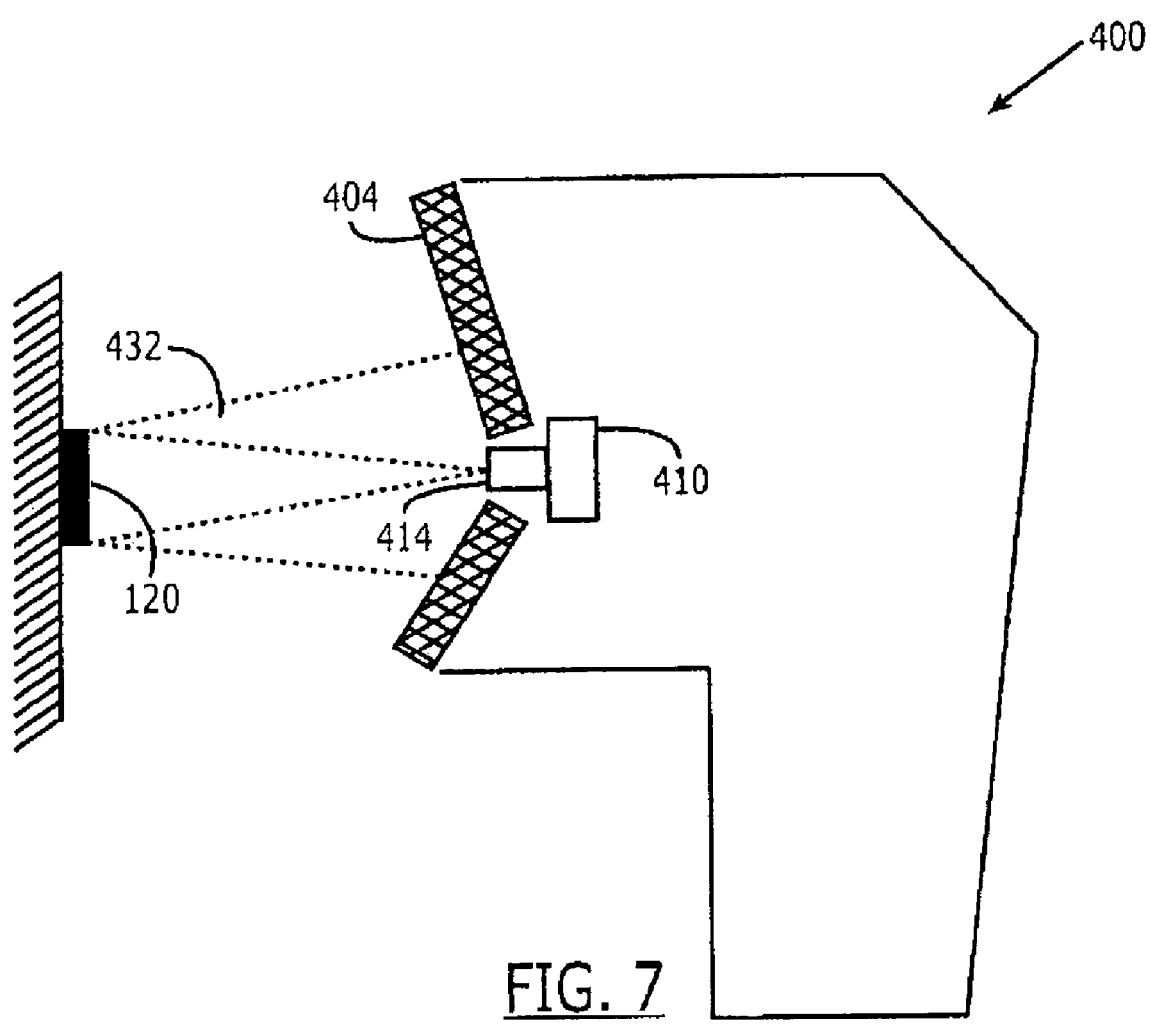
FIG. 7 is a diagram of a fifth exemplary embodiment of a barcode reader having a funnel shaped diffuser according to the present invention.

A further exemplary embodiment of a barcode reader 400 according to the present invention is shown in FIG. 7. In this exemplary embodiment, the centrally located camera 410 configuration of FIGS. 1 and 2 is used. However, the diffuser 404 of the reader 400 extends backwards in a funnel shape towards an opening 414 of the camera 410. Shaping the diffuser 404 as a funnel maximizes its dimensions relative to the size of the exit window of the device 400. The increased size of the diffuser 404 results in a larger diffuser FOV 432 than if the diffuser 404 was planar, thereby improving the illumination of the barcode 120. Thus, this exemplary embodiment may solve the orthogonal reflection issue with respect to the camera 410 in centrally located camera configurations by providing for a smaller camera opening and also provides for a larger diffuser FOV.

Figure 8:
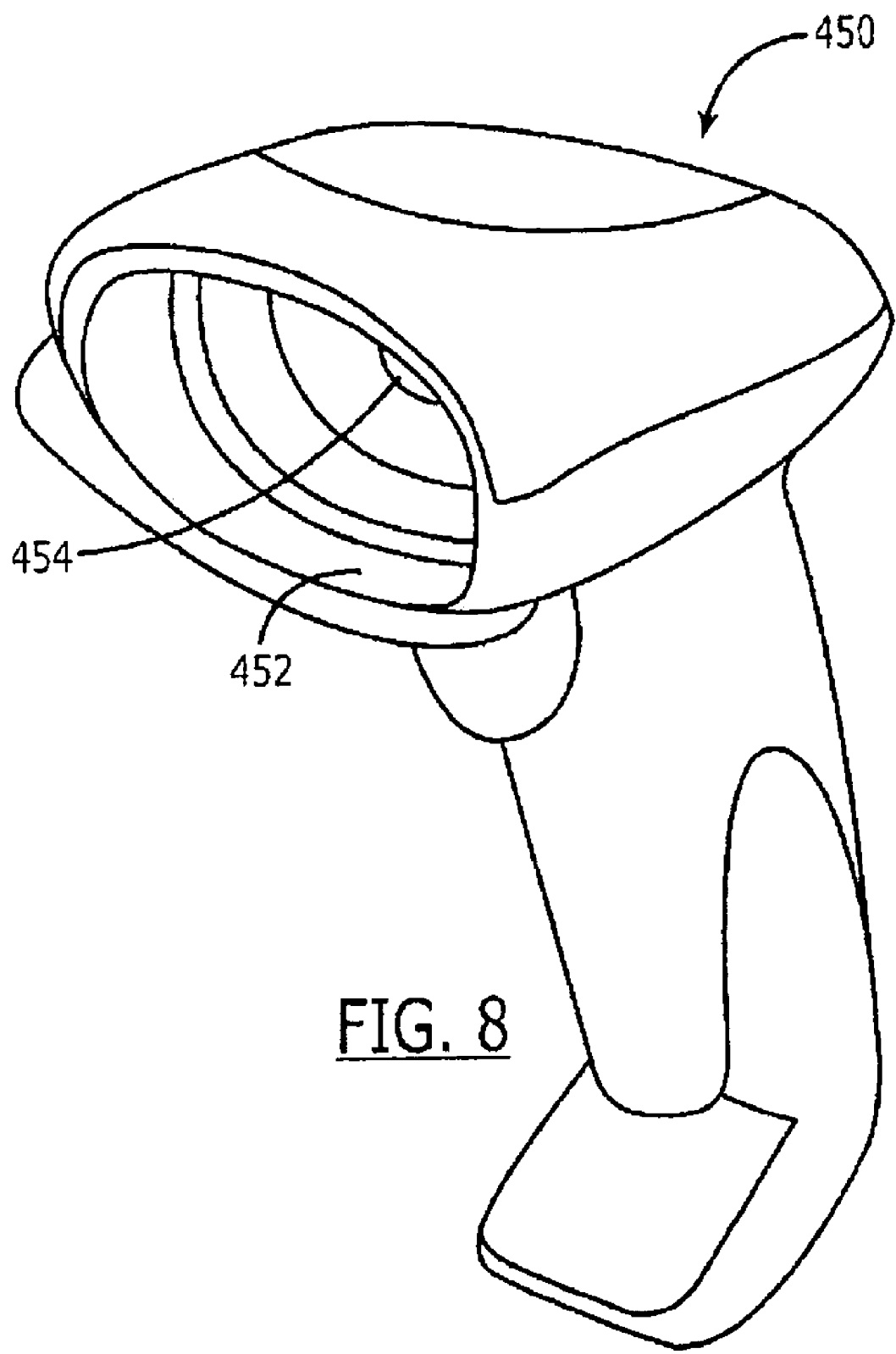
FIG. 8 is a perspective view showing an exemplary image scanner according to the present invention.

FIG. 8 shows an embodiment of a hand held barcode reader 450 having a funnel shaped diffuser 452 with a centrally located camera opening 454. As described above, such an arrangement may be used with a current design of a barcode reader. For example, the diffuser 452 and camera (not shown) may be able to be placed within a housing of a currently available barcode reader 450 without having to redesign the housing and other portions of the barcode reader 450. Thus, a supplier of devices may provide users with the benefit of the larger field of view without having to completely redesign the housing of their barcode readers.

Figure 10:
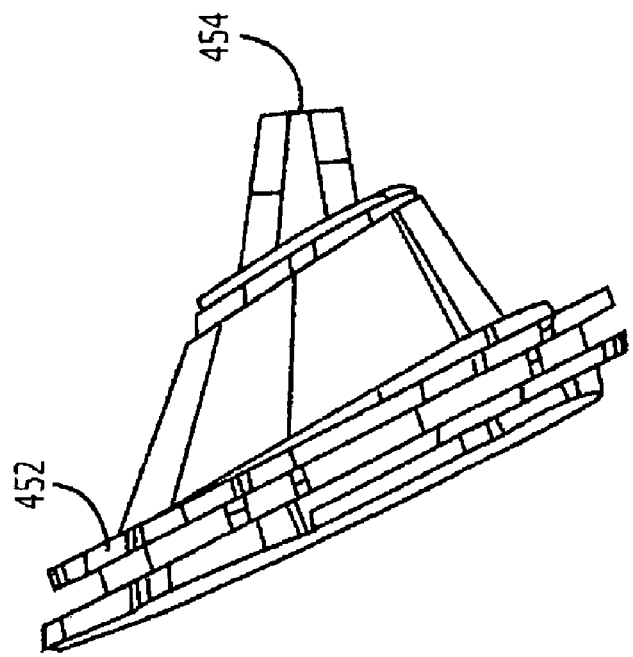
FIG. 10 is a side view showing the funnel shaped diffuser shown in FIG. 9.
Figure 9:
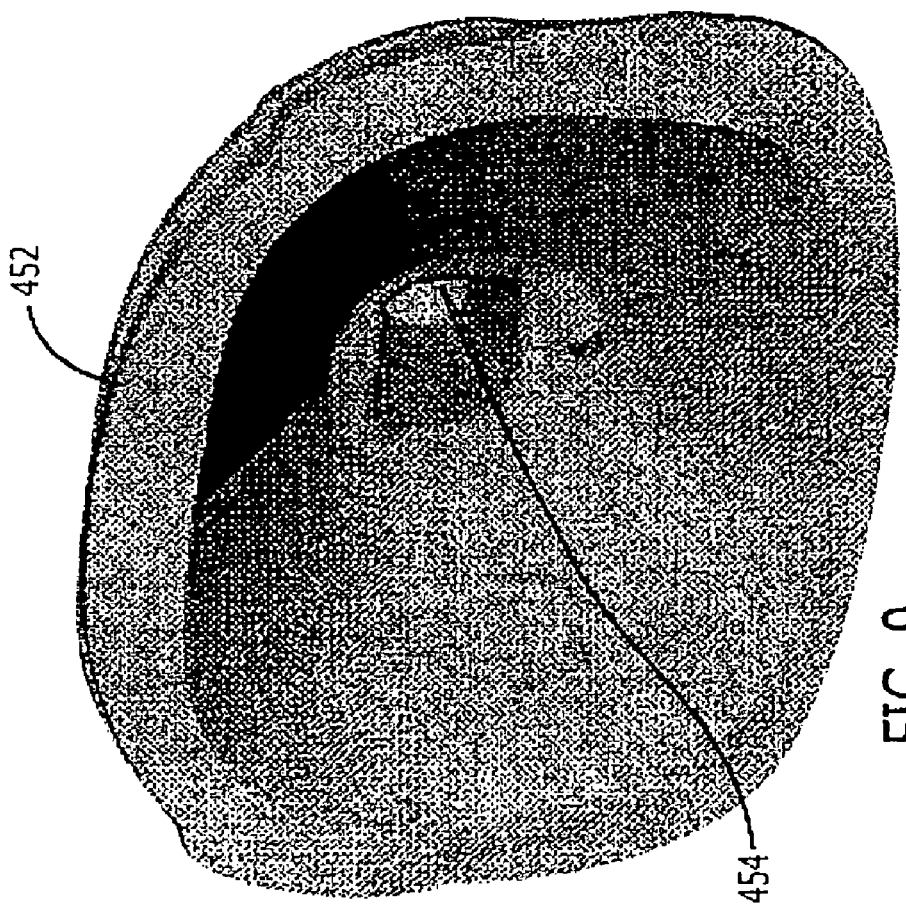
FIG. 9 is a perspective view of a funnel shaped diffuser according to the present invention, useable in the image scanner of FIG. 8.

FIGS. 9 and 10 show in more detail the funnel shaped diffusers according to the exemplary embodiment described above. The funnel shaped diffuser 452 comprises a camera opening 454 through which a camera can acquire the reflected image of a barcode. This exemplary embodiment of the funnel shaped diffuser 452 may be used with existing barcode readers, such as the DS6607 and DS6707 manufactured by Symbol Technologies. In this case, some of the advantages obtained by placing the effective camera opening outside of the diffuser may be limited to make the device compatible with existing barcode readers.

The present invention has been described with reference to specific exemplary embodiments. Those skilled in the art will understand that changes may be made in details, particularly in matters of shape, size, material and arrangement of parts. Accordingly, various modifications and changes may be made to the embodiments without departing from the scope of the claims below. The specifications and drawings are, therefore, to be regarded in an illustrative rather than a restrictive sense.

What is claimed is:

1. A barcode reader, comprising:
   a light source illuminating a barcode;
   a diffuser disposed between the light source and the barcode;
   a camera opening at least partially surrounded by the diffuser, the diffuser being located on a substantially similar plane to the camera opening, light reflected from the barcode passing through the camera opening; and
   a camera oriented to acquire light reflected from the barcode after passing through the diffuser from the light source; and
   wherein the camera orientation is selected to prevent the camera from acquiring light reflected from the barcode which subsequently passes through the diffuser.

2. The barcode reader according to claim 1, the diffuser extending around only a portion of a perimeter of the camera opening.

3. The barcode reader according to claim 1, the diffuser extending around an entirety of a perimeter of the camera opening.

4. The barcode reader according to claim 1, further comprising:
   a camera mirror oriented in the camera opening to direct the light reflected from the barcode to the camera.

5. The barcode reader according to claim 1, further comprising:
   an aiming device to assist a user in aligning the barcode reader with the barcode.

6. The barcode reader according to claim 5, further comprising:
   an aiming window at least partially surrounded by the diffuser, through which a light of the aiming device passes.

7. The barcode reader according to claim 1, wherein the light source includes a light emitting diode (LED).

8. The barcode reader according to claim 1, further comprising:
   a light pipe coupling the light source to the diffuser.

9. The barcode reader according to claim 1, wherein the diffuser is a curved diffuser.

10. The barcode reader according to claim 1, wherein the diffuser is a funnel shaped diffuser.

11. The barcode reader according to claim 1, further comprising:
    a mirrored reflector intensifying light from the light source illuminating the diffuser.

12. The barcode reader according to claim 1, further comprising:
    an exit window, wherein the light reflected from the barcode passes through the exit window prior to passing through the camera opening.

13. A method, comprising:
    providing light through a diffuser to a barcode and a specular background; and collecting, by a camera, light reflected from the barcode, the light passing though an opening in the diffuser, the diffuser being located on a substantially similar plane to the opening; and wherein the camera orientation is selected to prevent the camera from acquiring light reflected from the barcode which subsequently passes through the diffuser.

14. The method according to claim 13, wherein a perimeter of the opening is only partially surrounded by the diffuser.

15. The method according to claim 13, wherein a perimeter of the opening is completely surrounded by the diffuser.

16. The method according to claim 13, further comprising: reflecting, by a mirror, the light reflected from the barcode prior to collecting the reflected light by the camera.

17. The method according to claim 13, further comprising: aiming a laser light at the barcode.

18. The method according to claim 13, wherein the diffuser is one of a planar shape, a curved shape and a funnel shape.

19. A barcode reader, comprising:

a light means providing illumination for a barcode;

a diffusing means disposed between the light means and the barcode;

an opening at least partially surrounded by the diffusing means, the diffusing means being located on a substantially similar plane to the opening, light reflected from the barcode passing through the opening; and an image acquisition means oriented to acquire light reflected from the barcode after passing through the diffuser from the light source, wherein the orientation of the image acquisition means is selected to prevent the image acquisition means from acquiring light reflected from the light means which subsequently passes through the diffusing means.

* * * * *

UNITED STATES PATENT AND TRADEMARK OFFICE
CERTIFICATE OF CORRECTION

| | | |
|---|---|---|
| PATENT NO. | : 7,537,164 B2 | Page 1 of 1 |
| APPLICATION NO. | : 11/611631 | |
| DATED | : May 26, 2009 | |
| INVENTOR(S) | : Joseph et al. | |

It is certified that error appears in the above-identified patent and that said Letters Patent is hereby corrected as shown below:

In Column 1, Line 4, delete "BACKGOUND".

In Column 2, Line 44, delete "100" and insert -- 100. --, therefor.

In Column 7, Line 2, in Claim 13, delete "though" and insert -- through --, therefor.

Signed and Sealed this

Twenty-fifth Day of May, 2010

David J. Kappos
*Director of the United States Patent and Trademark Office*